(12) United States Patent
Cobb et al.

(10) Patent No.: US 7,627,607 B2
(45) Date of Patent: Dec. 1, 2009

(54) RHETORICAL CONTENT MANAGEMENT SYSTEM AND METHODS

(75) Inventors: John Neil Cobb, Plano, TX (US); Yeow Loong Lee, St. Louis, MO (US)

(73) Assignee: AT&T Intellectual Property I, L.P., Reno, NV (US)

( * ) Notice: Subject to any disclaimer, the term of this patent is extended or adjusted under 35 U.S.C. 154(b) by 519 days.

(21) Appl. No.: 11/498,219

(22) Filed: Aug. 2, 2006

(65) Prior Publication Data

US 2007/0033207 A1 Feb. 8, 2007

Related U.S. Application Data

(62) Division of application No. 10/635,419, filed on Aug. 6, 2003, now abandoned.

(51) Int. Cl.
*G06F 17/00* (2006.01)

(52) U.S. Cl. ............................. 707/104.1; 707/1; 707/3; 707/10; 707/100

(58) Field of Classification Search ................. 707/100, 707/1, 3, 10, 104.1
See application file for complete search history.

(56) References Cited

U.S. PATENT DOCUMENTS

| | | | |
|---|---|---|---|
| 5,537,586 A * | 7/1996 | Amram et al. .................. | 707/3 |
| 5,819,260 A | 10/1998 | Lu et al. | |
| 6,026,388 A * | 2/2000 | Liddy et al. ..................... | 707/1 |
| 6,038,573 A * | 3/2000 | Parks .......................... | 715/202 |
| 6,112,168 A | 8/2000 | Corston et al. | |
| 6,185,587 B1 * | 2/2001 | Bernardo et al. ............ | 715/234 |
| 6,199,034 B1 | 3/2001 | Wical | |
| 6,230,173 B1 * | 5/2001 | Ferrel et al. .................. | 715/205 |
| 6,263,336 B1 | 7/2001 | Tanaka | |
| 6,349,316 B2 | 2/2002 | Fein et al. | |
| 6,353,824 B1 | 3/2002 | Boguraev et al. | |
| 6,374,271 B1 | 4/2002 | Shimizu et al. | |
| 6,513,063 B1 | 1/2003 | Julia et al. | |
| 6,523,061 B1 | 2/2003 | Halverson et al. | |
| 6,549,922 B1 | 4/2003 | Srivastava et al. | |
| 6,553,373 B2 | 4/2003 | Boguraev et al. | |
| 6,574,660 B1 | 6/2003 | Pashupathy et al. | |
| 6,675,159 B1 | 1/2004 | Lin et al. | |
| 6,901,402 B1 | 5/2005 | Corston-Oliver et al. | |
| 7,013,259 B1 | 3/2006 | Polanyi et al. | |
| 7,092,974 B2 | 8/2006 | Thomas et al. | |
| 7,133,862 B2 * | 11/2006 | Hubert et al. .................. | 707/3 |
| 7,266,553 B1 * | 9/2007 | Anderson et al. .............. | 707/5 |

(Continued)

*Primary Examiner*—Don Wong
*Assistant Examiner*—Thanh-Ha Dang
(74) *Attorney, Agent, or Firm*—Toler Law Group (57) ABSTRACT

A system and method of managing content are disclosed. In a particular embodiment, the method of managing content includes receiving a request from a content application for content associated with a content subject and selectively retrieving a plurality of fields of a record stored at a database. The record is associated with the content subject. Each of the plurality of fields includes a content segment. Further, the method includes converting each content segment to a first format associated with a first content application. The first content application includes at least one of the content segments with content having a first technical level. The method also includes converting each content segment to a second format associated with a second content application. The second content application includes at least one of the content segments with content having a second technical level greater in technical specificity than the first technical level.

20 Claims, 5 Drawing Sheets

```
Technical XML Structure (Code)
<?xml version="1.0" encoding="iso-8859-1" ?>
<Product_Profile>
  <Product id="1">
    <Region>
      <PAC>
        <Product_Name>DSL Internet</Product_Name>
        <Expanded_Product_Name>Digital Subscriber Line (DSL)
            Internet</Expanded_Product_Name>
        <Updated_Date>2002-01-24</Updated_Date>
        <Updated_Time>13:54:00</Updated_Time>
        <Description>
          <Classical_Def>
602 ─── <Class_Description>high speed, point-to-point digital
              connection </Class_Description>
604 ─── <Product_Description>uses regular telephone lines to
              simultaneously transmit voice and
              data.</Product_Description>
606 ─── <Comp_Old_New>DSL Internet allows you to connect to the
              Internet at speeds 50 to 200 times faster than a 28.8
              kbps modem.</Comp_Old_New>
          </Classical_Def>

Layout In XSLT
SBC Pacific Bell <Expanded Product Name> is a <Class Description> that
<Product Description>. <Comp Old New>

Actual Output
SBC Pacific Bell Digital Subscriber Line (DSL) Internet is a high speed, point-to-
point digital connection that uses regular telephone lines to simultaneously
transmit voice and data. DSL Internet allows you to connect to the Internet at
speeds 50 to 200 times faster than a 28.8 kbps modem.
```

600

U.S. PATENT DOCUMENTS

| | | | |
|---|---|---|---|
| 7,284,191 B2* | 10/2007 | Grefenstette et al. | 715/230 |
| 7,284,239 B1* | 10/2007 | Young et al. | 717/137 |
| 7,334,216 B2* | 2/2008 | Molina-Moreno et al. | 717/109 |
| 2002/0032709 A1* | 3/2002 | Gessner | 707/540 |
| 2002/0095411 A1* | 7/2002 | Caldwell et al. | 707/5 |
| 2002/0102524 A1* | 8/2002 | Rizzi et al. | 434/350 |
| 2002/0107776 A1* | 8/2002 | Bove et al. | 705/37 |
| 2003/0033288 A1* | 2/2003 | Shanahan et al. | 707/3 |
| 2003/0065533 A1 | 4/2003 | Scheinkman | |
| 2003/0126136 A1 | 7/2003 | Omoigui | |
| 2004/0034520 A1* | 2/2004 | Langkilde-Geary et al. | 704/1 |
| 2005/0033750 A1 | 2/2005 | Cobb et al. | |
| 2005/0193335 A1* | 9/2005 | Dorai et al. | 715/530 |
| 2006/0235738 A1* | 10/2006 | Doyle et al. | 705/9 |
| 2006/0271578 A1 | 11/2006 | Cobb et al. | |
| 2007/0033207 A1 | 2/2007 | Cobb et al. | |
| 2007/0067371 A1 | 3/2007 | Allan et al. | |

* cited by examiner

| | [Rhetorical Structure] | [Syntax Structure] |
|---|---|---|
| Description 516 | [classsical_definition] [product] is a [product class] that [key differentiator]. | 502 |
| | [main_CompOldNew] [product] lets you [key benefit] than [comparable product]. | 504 |
| | [suppl_CompOldNew] [statement]. [point statement]. [differentiator#] [statement]. [point statement]. [analogy] [statement]. [point statement]. [example] [statement]. [point statement]. | 506 |
| | [product_howdoes] [product] uses [technology or equipment] to/as [function statement]. [illustration description#]. [suppl_howdoes] [description statement]. | 508 |
| Features & Benefits 518 | [features_stem] [product] gives you these features: [feature_name#] [feature_name] — [feature_benefit#]. | 510 | eBrochureBuilder Description — 512

ProposalBuilder Recommendation — 514

*FIG. 5*

```
Technical XML Structure (Code)
<?xml version="1.0" encoding="iso-8859-1" ?>
<Product_Profile>
  <Product id="1">
    <Region>
      <PAC>
        <Product_Name>DSL Internet</Product_Name>
        <Expanded_Product_Name>Digital Subscriber Line (DSL)
            Internet</Expanded_Product_Name>
        <Updated_Date>2002-01-24</Updated_Date>
        <Updated_Time>13:54:00</Updated_Time>
        <Description>
          <Classical_Def>
            <Class_Description>high speed, point-to-point digital
                connection </Class_Description>
            <Product_Description>uses regular telephone lines to
                simultaneously transmit voice and
                data.</Product_Description>
            <Comp_Old_New>DSL Internet allows you to connect to the
                Internet at speeds 50 to 200 times faster than a 28.8
                kbps modem.</Comp_Old_New>
          </Classical_Def>
```

(602 — Class_Description; 604 — Product_Description; 606 — Comp_Old_New)

Layout in XSLT
SBC Pacific Bell <Expanded Product Name> is a <Class Description> that <Product Description>. <Comp Old New>

Actual Output
SBC Pacific Bell Digital Subscriber Line (DSL) Internet is a high speed, point-to-point digital connection that uses regular telephone lines to simultaneously transmit voice and data. DSL Internet allows you to connect to the Internet at speeds 50 to 200 times faster than a 28.8 kbps modem.

*FIG. 6*

RHETORICAL CONTENT MANAGEMENT SYSTEM AND METHODS

REFERENCE TO RELATED APPLICATIONS

This application is a divisional application of, and claims priority from, U.S. application Ser. No. 10/635,419, filed Aug. 6, 2003, the contents of which are hereby incorporated in their entirety.

FIELD OF THE DISCLOSURE

This disclosure relates, in general, to rhetorical content management systems and methods for their use.

BACKGROUND

Content management is useful for providing a consistent image through various content delivery methods. For example, content management may be useful in providing a consistent product description across multiple sales and marketing mediums such as websites, proposals, brochures, and other documents.

However, content management becomes a significant problem for large organizations having multiple products or product lines. A large amount of content is provided to a large number of users. These problems may be further exacerbated by variances in regional availability, market targeting, and the greater demand for content through large sales channels. Delivery of suitable content is often slow.

In addition, content creation is a significantly expensive process. Initial creation is expensive. After initial content creation, the content may not be suitable for various purposes. As such, expenses increase as content is manually adapted for various uses.

Some organizations rely on multiple content management systems. Each system is managed by a different section. As such, content is created more than once and varies between sections. Therefore, it is difficult to create content that is consistent and accurate.

For large entities with extensive product lines, content management becomes a large and expensive process. As such, an improved content management system would be desirable.

SUMMARY

The present disclosure is directed generally to a content management system, a method of content management, a rhetorical content model, and automated methods of generating proposals and other documents based thereon.

In a particular illustrative embodiment, a method of managing content is disclosed. The method includes receiving a request from a content application for content associated with a content subject. The method also includes selectively retrieving a plurality of fields of a record stored at a database, wherein the record is associated with the content subject and wherein each of the plurality of fields includes a content segment. Further, the method includes converting each content segment to a first format associated with a first content application, where the first content application includes at least one of the content segments with content having a first technical level. The method also includes converting each content segment to a second format associated with a second content application, where the second content application includes at least one of the content segments with content having a second technical level that is greater in technical specificity than the first technical level.

In accordance with another particular embodiment, a content management system is disclosed and includes a content server configured to selectively retrieve at least one content segment of a plurality of content segments stored at a database communicating with the content server. The content server is configured to convert the at least one content segment to a first format and to provide a first data file that includes the at least one content segment to a first content application, wherein the first content application includes the content segment with content having a first technical level. The content server is configured to convert the at least one content segment to a second format and to provide a second data file that includes the at least one content segment to a second content application, where the second content application includes the content segment with content having a second technical level that is greater in technical specificity than the first technical level.

In accordance with another embodiment, a method of content management is disclosed and includes requesting at least one content segment associated with a content subject from a content server. The method also includes receiving at least one grammatical syntax element from the content server, wherein the content server selectively retrieves the at least one grammatical syntax element from a plurality of grammatical syntax elements stored at a database. Further, the method includes constructing first content related to the content subject, the first content including the at least one grammatical syntax element and a first marketing brand. The method also includes constructing second content related to the content subject, the second content including the at least one grammatical syntax element and a second marketing brand. The method also includes delivering the first content to the first content application and the second content to the second content application over the distributed network via a gateway application.

In accordance with another particular embodiment, a content management system is disclosed and includes an application server configured to communicate with a distributed network to receive requests associated with a content subject from a first content application and a second content application. The application server is configured to send requests to a content server for content segments associated with the content subject. The application server is configured to communicate with the content server to receive a tag-segmented data file, the tag-segmented data file including a plurality of content segments associated with the content subject. The application server is configured to selectively construct first content relating to the content subject, the first content including at least one of the plurality of content segments and a first marketing brand. The application server is configured to selectively construct second content relating to the content subject, the second content including at least one of the plurality of content segments and a second marketing brand. The application server is configured to deliver the first content to the first content application and the second content to the second content application over the distributed network via a gateway application.

DETAILED DESCRIPTION OF THE DRAWINGS

Figure 1:
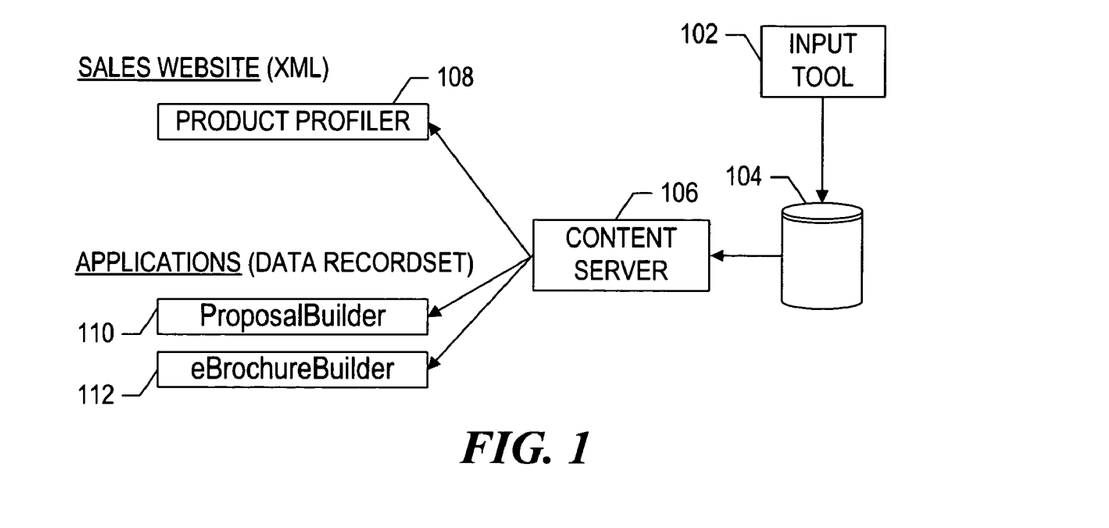
FIG. 1 depicts an exemplary embodiment of a content management system.

FIG. 1 depicts an exemplary embodiment of a content management system. The content management system includes a content database 104 and a content server 106. In addition, the content management system includes an input tool 102 and various applications 108, 110 and 112.

The input tool 102 is used to gather content segments and store those segments in a database 104. The content segments may, for example, be sentence fragments, phrases, nouns, sentences, and paragraphs. In one exemplary embodiment, sentence fragments are entered, following a specific grammatical format that fulfills a specified rhetorical purpose. Using the rhetorical format, parts of a sentence may be gathered, stored and associated as fields in the content database 104. Rhetorical principles control the development of the syntax from the grammatical elements and drive the deployment of the content to the application based on the communication function that the write wants to achieve.

The database 104 may be a database such as an Oracle® or SQL database. The database 104 stores records or file references. Each record is associated with a content subject and may have multiple fields. The fields may contain sentence fragments, phrases, sentences, nouns, and paragraphs. This content data may be selectively used to construct content associated with the content subject.

The content server 106 is coupled to the database 104 and accesses the records associated with the content subjects. Applications such as product profiler 108, proposal builder 110, and e-brochure builder 112 access the content server 106, requesting content associated with a content subject. The content server 106 accesses the database 104 to selectively retrieve requested fields of the record associated with the requested content subject. The content server 106 may provide the content elements in various formats, including a data record set and an XML document.

The applications may construct content using the various formats or models. Some of the fields in the record may, for example, follow a rhetorical model. In this example, the model utilizes sentence elements having a specific grammatical form designed to meet a particular rhetorical or communication function. The sentence elements or grammatical syntax rules may be used to construct a sentence. In one exemplary embodiment, the rhetorical model may be used to form a sentence having three elements, a product name, product class, and product description as shown below. The rhetorical/communication function this grammatical contruct is designed to achieve is DEFINE.

<<Product name>> is a <<product class>> that <<product description>>.

To produce a grammatically correct sentence, the elements follow specific grammatical forms. For example, the product name is a noun, the product class may be a noun that agrees with the singular verb "is" and singular article "a", and the product description may be a phrase beginning with a third-person singular active verb. An example is <<A chair>> is a <<piece of furniture>> that <<has four legs, a platform for sitting, and a back to lean against>>.

Sentence elements may be stored in the database 104. Fields within records associated with content subjects may store grammatical syntax elements that may be used to create sentences based on one or more rhetorical formats. For example, the product name and product class may be used to make a sentence. In another example, the product name field and product description may be used to build another sentence. Alternately, the product name may be used with another element to build a third sentence.

In addition, fields within the record may be used to store phrases, sentences, or paragraphs that fulfill a specified rhetorical/communication function. For example, fields may store teaser sentences, point statements, illustrative descriptions, analogy statements, and feature statements. For example, sentences or phrases may relate to additional differentiators such as differentiating details such as physical or conceptual differences to other products in a class, comparisons with older technologies, examples, inventories, and analogies. In another example, a point statement may be included that further describes the product such as an advantage or usage from the target audience's point of view.

The database may further store contexts in which a content or content element is applicable. For example, content elements relating to the same content subject may be provided for different markets, regions, and branding efforts. In one exemplary embodiment, different legal statements may be provided for use with content based on the region. In another example, different content elements may be provided for marketing to different target markets. In a further example, different content elements such as product names may be associated with a content subject for different branding efforts. Different content elements may be provided for various technical levels as well.

The fields stored within the records may then be queried to selectively retrieve elements that may be utilized to create content. One exemplary application is the product profiler system 108. The content server 106 provides a tagged-segmented data file, such as an extensible markup language (XML) file, including the requested data elements to the product profiler system 108. The product profiler system 108 interprets the tagged-segmented data file to produce content for delivery through a network such as via a web page.

In other exemplary embodiments such as proposal builder 110 or e-brochure builder 112, the content server 106 may provide the content elements as a data record set. The applications 110 and 112 interpret the data record set, selectively utilizing the content elements to develop context-specific content. The content may then be provided in a document, flash file, PDF, or other electronic format.

In one exemplary embodiment, the content management system may be integrated with enterprise architecture. Applications may reside on a user end of the architecture while the content server and database reside in a business services section. In other embodiments, the system may be implemented on an intranet and use browser technology.

In this manner, content elements associated with a content subject may be reused in various contexts or for various purposes. As such, the content elements may be re-purposed and utilized automatically.

Figure 2:
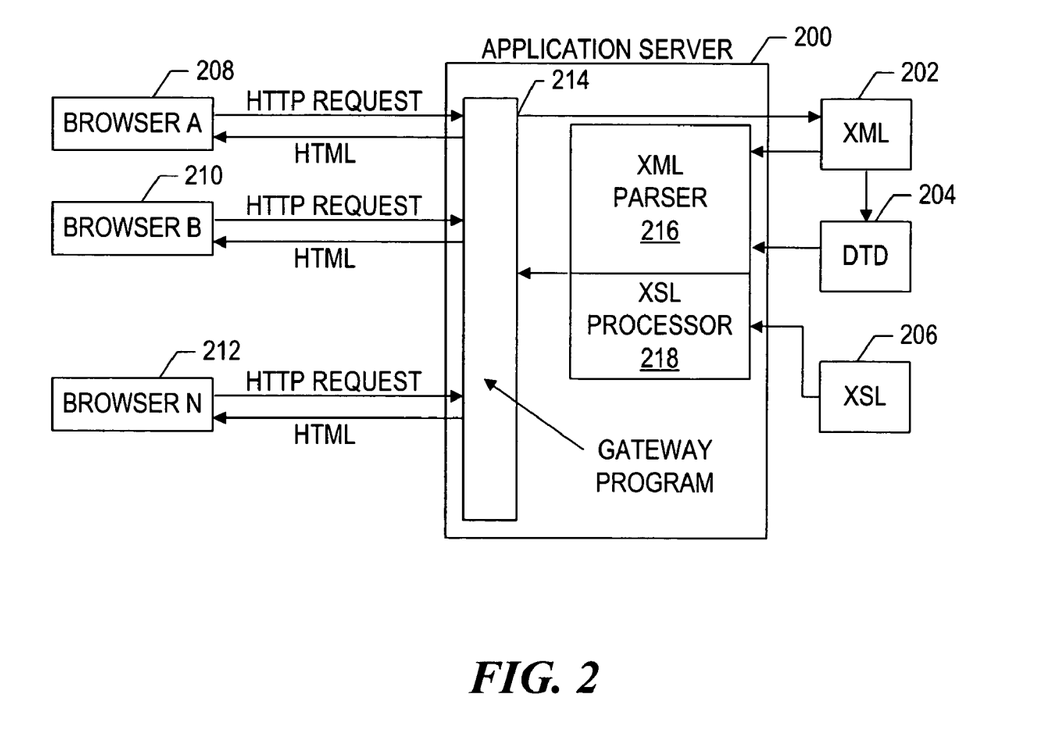
FIG. 2 depicts an exemplary embodiment of a rhetorical content delivery system.

FIG. 2 depicts an exemplary application for creating content. In this exemplary embodiment, a website may be delivered to users. The pages may include content automatically created using the content elements stored in the database. An application server 200 receives requests associated with a content subject from browsers 208, 210 and 212. The application server may have a gateway program 214 that acts to receive the requests and provide the output. In exemplary embodiment, the gateway program 214 receives HTTP requests and provides each HTML web page content.

Upon receiving a request from the gateway program 214, the application server 200 may acquire an extensible markup language (XML) file 202 associated with the requested content subject. The XML may have tags that identify the elements. The XML file 202 may be interpreted by an XML parser 216. The XML file 202 may be associated with a document type definition (DTD) file 204 and further interpreted in accordance with the document type definition (DTD) file 204. The application server 200 may also include an XSL file 206 as interpreted by an XSL processor 218. Together, the XML parser 216 and the XSL processor 218 provide content elements to the gateway program 214. The gateway program 214 assembles the content elements into content included in the web pages.

Each web page may utilize different elements derived from the grammatical syntax fields stored in the database and transferred utilizing the XML file 202. In this manner, the content elements may be utilized in accordance with the intended purpose of the content.

Figure 3:
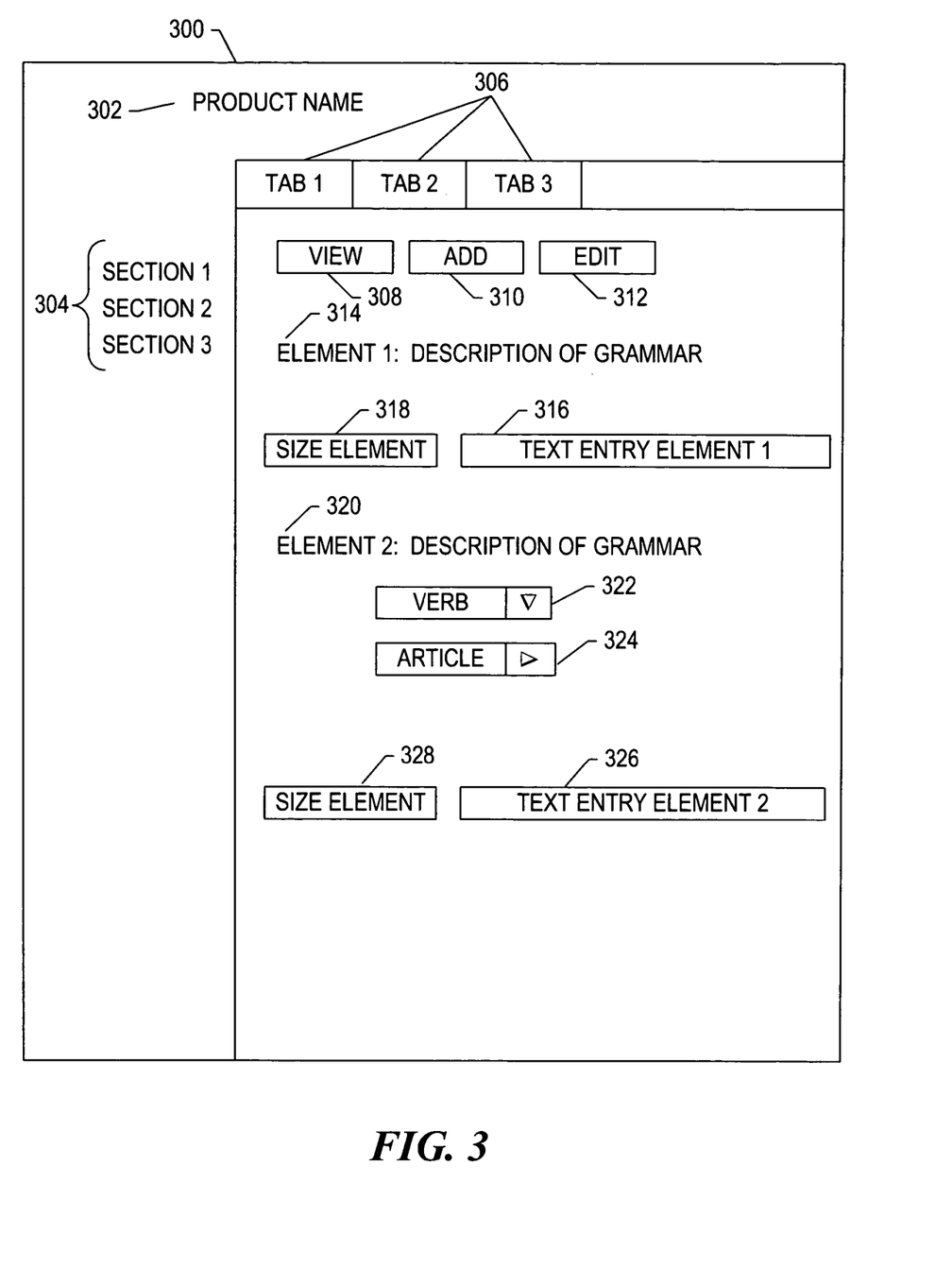
FIG. 3 illustrates an exemplary embodiment of an input tool.

FIG. 3 depicts an exemplary user interface or input tool for entering data into a rhetorical content management database. In this exemplary embodiment, the content subject is a product. The user interface takes the form of a page 300 that includes a product name 302. The page may, for example, be a web page.

Data associated with the product may be subdivided into sections 304, each section having an associated entry page or anchor within the displayed page. The sections may, for example, be subdivisions associated with what a product does, how it works, what it is, general information, branding information, frequently asked questions associated with the product, teasers, product features, advantages, applications, implementation, success stories, components, diagrams, options, availability, legal notices, white papers, and other information.

The interface may be further subdivided into tabbed sections that define certain grammatical structures for a particular content subject, using tabs 306. These tabbed sections may be displayed as individual web pages and each section may have multiple tab pages associated with it. In addition, each page may include an element such as a button. The pages may include buttons such as a view button 308, an add button 310, and an edit button 312. The view button 308 may facilitate a display of content elements associated with the product name 302. The add button 310 may add content entered into the page to the record in the database. The edit button 312 may, for example, unlock text entry fields, permitting editing of text associated with the content elements. Alternately, other buttons may be used to manipulate records within the database.

In this exemplary embodiment, two content elements are shown. Element 314 includes a description of the grammar rules to be applied when entering text. The element 314 may additionally include a text entry form element 316 and a size element 318 that indicates either total size permitted in the text entry element 316, the number of characters remaining for use in the text entry element 316, or the number of characters used in the text entry element 316. For example, element 314 may be a sentence or product tease designed to grab the attention of a potential purchaser. The grammatical and content-guidance rules associated with element 314 may require or suggest that the element be entered as a sentence or a question. The text entry element 316 may, for example, be limited to a size of 250 characters. As the text entry element 316 is used, the number of characters remaining may be displayed in the size element 318.

Element 320 may, for example, be a product classification. The product classification may be used in a rhetorical or classical rhetorical format and require an associated verb, article, and structured phrase or noun. In the exemplary embodiment, a drop-down menu is provided for selecting a verb form that agrees with a controlling grammatical element 322 such as "is" or "are". Another drop-down menu 324 is provided for selecting an article such as "a" or "an". A text entry form element 326 is provided for entering the product class syntax. In addition, a size element box 328 may be provided. For example, in a classic rhetorical format, a sentence may be constructed using the product name 302, the verb selected in menu 322, the article selected in menu 324, and the text in the text entry form element 326. The sentence would read: <<Product name>> is/are a/an <text entry>>. The verb selected in menu 322, the article selected in menu 324, and the text of text entry element 326 may be stored in a database and reapplied as needed for specific purposes.

Other elements may be entered such as product descriptions, teasers, descriptions of how a system works, success stories, feature names, and point statement sentences. These elements may also have an associated field in the records of the database.

Figure 4:
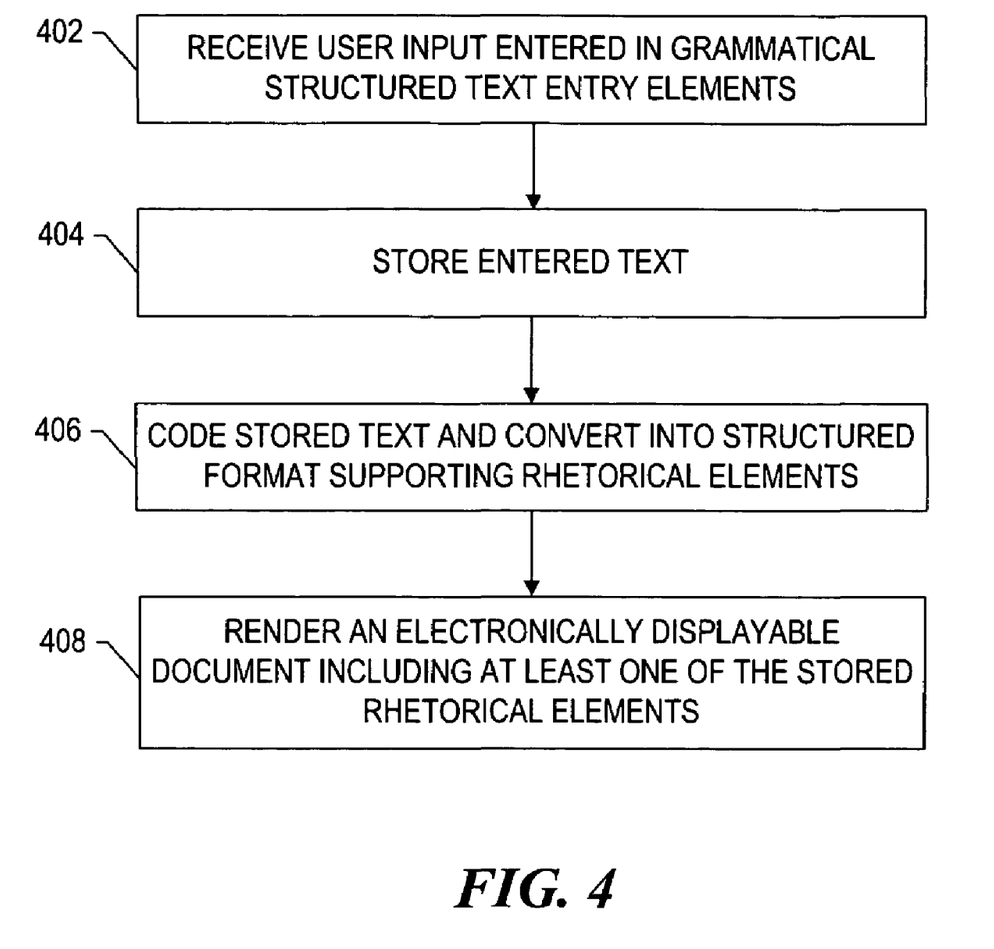
FIG. 4 depicts an exemplary method of content management.

FIG. 4 depicts an exemplary method of content management. The content management system may receive a user input entered in the grammatically structured text entry elements as shown at step 402. The text entered in its grammatically structured format may be stored in the database records as shown at step 404. Some fields may store nouns. Other fields may store phrases starting with a specific verb having a specific tense and number. These fields may be combined according to their associated rhetorical structure to form sentences. Additional fields may store sentences and paragraphs having an associated purpose. The database stores these elements to fulfill rhetorical/communication purposes.

The content management system may then code the stored text and convert it into structured format-supporting rhetorical elements as shown at step 406. For example, the content management system may query the records and create data record sets. In another embodiment, the content management system may query the stored records and formulate tag-structured data files such as XML files for use by other applications. The content management system may then render an electronically displayable document including at least one of the stored rhetorical elements as shown at step 408. For example, the content management system may display a web page utilizing some of the rhetorical data elements. Alternately, the content may be re-purposed and utilized for brochures, proposals, or other documents needing to fulfill a similar rhetorical/communication purpose. The content used in the brochures or proposals may utilize different rhetorical elements from those utilized in providing content for web pages, or in some cases, use the same elements or subsets, depending on the space available and the degree of content needed.

Figure 5:
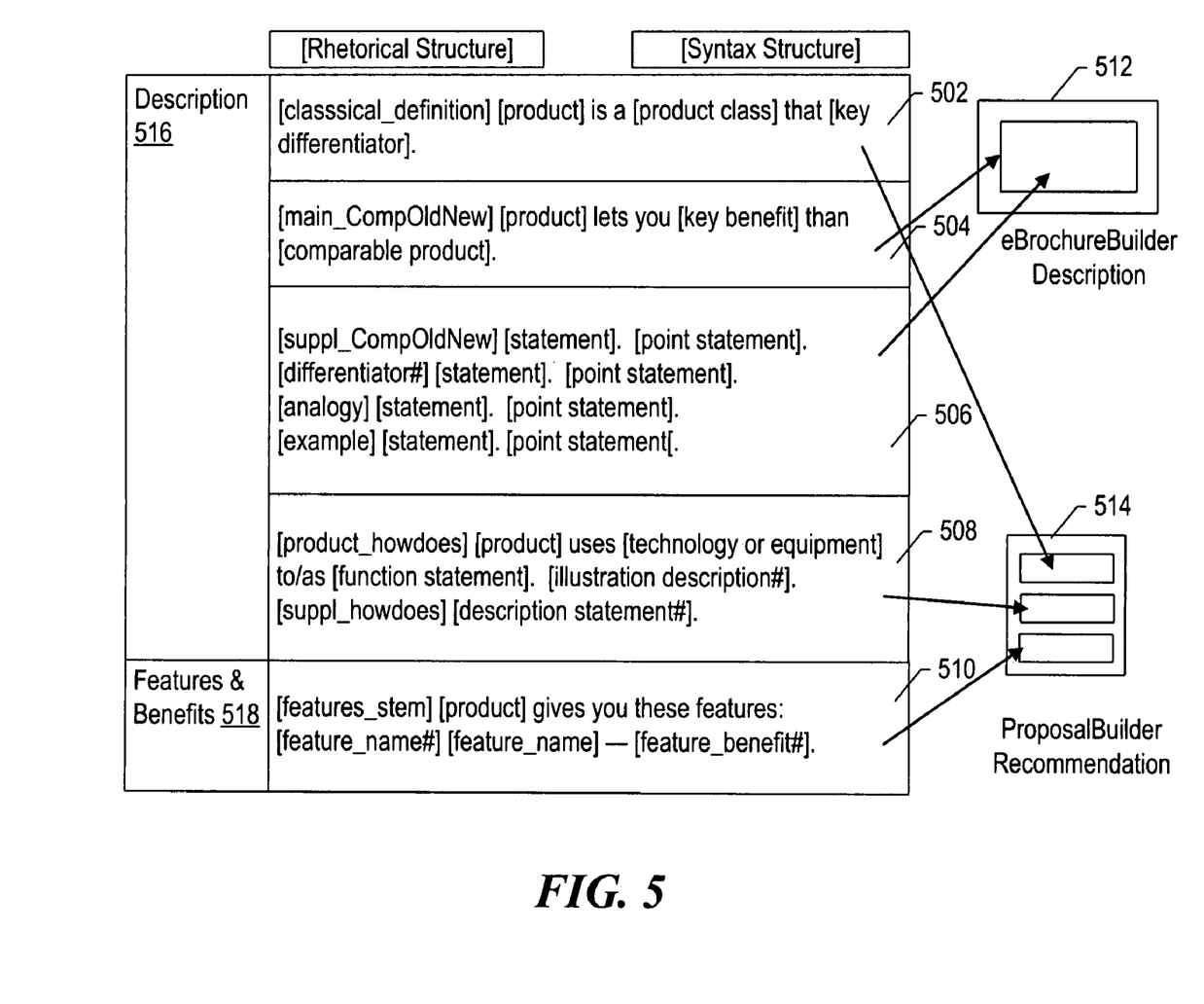
FIG. 5 illustrates an exemplary distribution/repurposing of rhetorically structured content.

FIG. 5 depicts the exemplary use of content data associated with a content subject and its selective use in various applications. The data may be organized into a description 516, features and benefits 518, and other categories. Elements may be stored that can be used in a rhetorical structure to produce content. Each of the elements for use in a rhetorical structure may have a syntax that has the appropriate grammatical format for use in the rhetorical structure. In one exemplary embodiment, a classical rhetorical definition 502 may be used. A sentence structure may be provided such as <<Product name>> is a <<product class>> that has <<a key differentiator>>. A data structure may be provided that stores the product name, the product class, and the key differentiator. The product name, product class and key differentiator may each have a specific grammatical syntax that permits their use in this rhetorical structure, while allowing them to be used together or separately by other grammatical structures that serve similar or even widely different rhetorical/communication purposes in other applications.

Another rhetorical structure, such as the comparison between the old and new as shown in block 504, may also use the product name. The rhetorical structure 504 may utilize a key benefit field and comparable product field that have syntax or grammatical structures different than those of the product class or key differentiator. For example, the key differentiator may have a different format than the key benefit. The different syntax for the comparison old/new is based on the rhetorical function of comparison. The payoff statement may be a benefit. The differing syntax would let a re-user emphasize this benefit over others and add flexibility to the application's discussion of the content.

Other rhetorical structures such as rhetorical structure 506 may utilize sentence syntax structures. Each sentence syntax structure may have a specific purpose. Alternately, such as in how does rhetorical structure 508, a rhetorical structure may be formulated using syntax elements that constitute nouns or phrases as well as syntax structures that include sentences and paragraphs. Syntax structure elements such as the product name may be reused in many rhetorical structures. Other elements may be specific to a given rhetorical structure. Further, these rhetorical structures and the syntax elements may be selectively utilized for different purposes.

An e-brochure may be built utilizing the comparison between the old and new 504 as well as a supplemental comparison between the old and new 506. Alternately, a proposal builder 514 may utilize the classical definition structure 502, the product how does rhetorical structure 508, and the features rhetorical structure 510. In this manner, elements and structures associated with a content subject may be selectively utilized to produce content for differing purposes.

Figure 6:
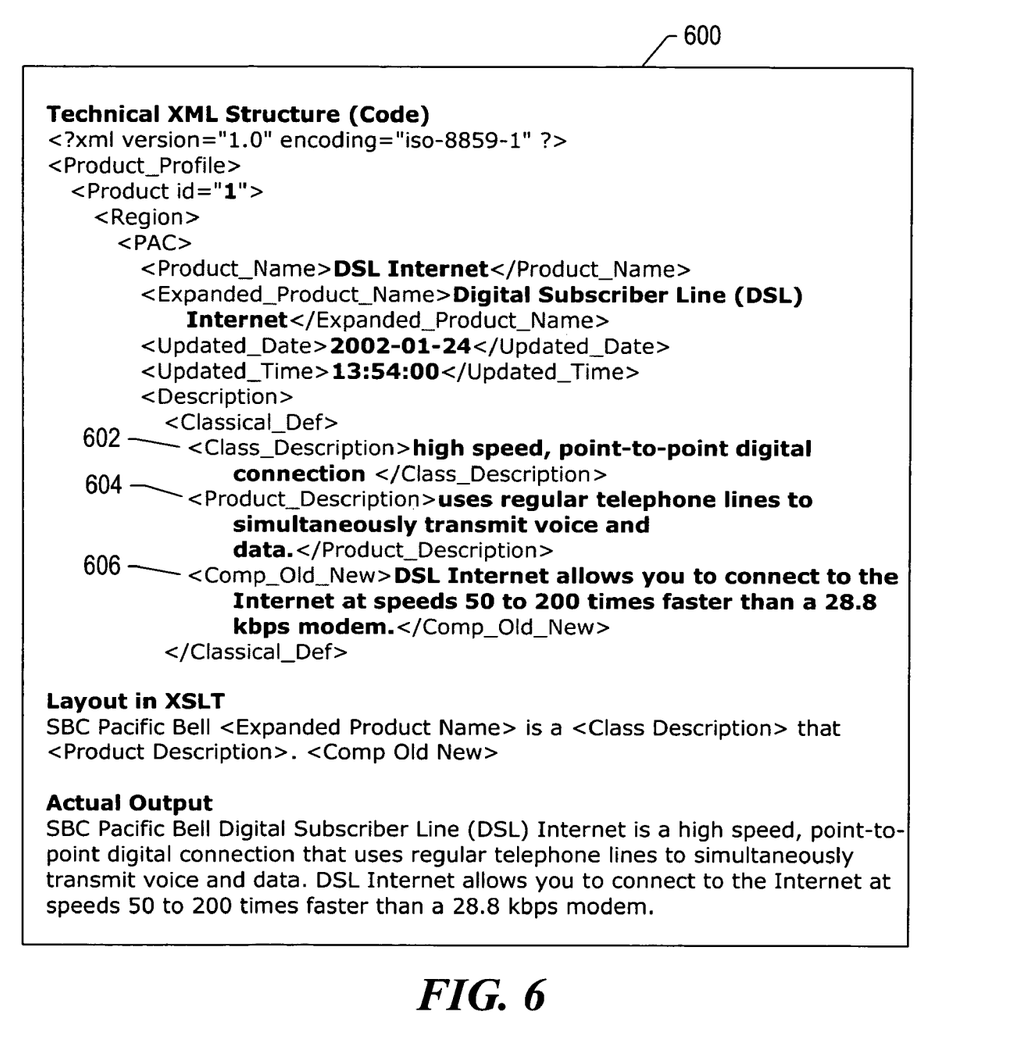
FIG. 6 depicts an exemplary rhetorical data structure.

FIG. 6 depicts an exemplary tag-segmented data file 600. The tag-segmented data file may, for example, be an XML file. The XML file may be produced by the content management system from the content stored in the content database. The tag-segmented data file 600 may be used to store a complete data record or partial data associated with a content subject. In the exemplary embodiment of FIG. 6, a product profile is specified. The product profile may have an associated product ID. The data may be further segmented for use in specific markets or regions as indicated by the <Region> tag. <PAC> indicates a specific region and several specific regions may be specified. A tag and tag end are provided for the product name, expanded product name, update date, and update time. These latter two are content management elements. In addition, tags are provided for subdivisions of content elements. For example, a <Description> tag may identify one or more sets of description elements. A description element may for example follow a classical format as indicated by the <Classical_Def> tag. Elements that follow the grammatical format of the classical definition may then be provided as indicated by separate tags. For example, a class description 602, product description 604, and comparison sentence 606 may be provided. The class description and product description may be combined with the product name to form a classical rhetorical sentence. The comparison sentence 606 may be appended to the classical definition to form a paragraph for use in building content.

Additional files such as XSL files may specify how a sentence or content is to be constructed using the content elements of the XML file. The actual output is shown.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-implemented method of managing content, the computer-implemented method comprising:
   receiving a request from a content application for content associated with a content subject;
   selectively retrieving a plurality of fields of a record stored at a database, wherein the record is associated with the content subject, wherein each field of the plurality of fields includes a content segment, and wherein the content segment includes a grammatical syntax element;
   converting the content segment of each field to a first format associated with a first content application, wherein the first content application includes at least a first content segment with content having a first technical level;
   converting the content segment of each field to a second format associated with a second content application, wherein the second content application includes at least a second content segment with content having a second technical level that is greater in technical specificity than the first technical level; and
   creating an electronically distributable document comprising grammatically correct sentences based on the first format and the second format.

2. The computer-implemented method of claim 1, further comprising:
   providing the content segment of each field to the first content application, wherein the first content application constructs content related to the content subject using the first format and at least one of the first content segment or the second content segment; and
   providing the content segment of each field to the second content application, wherein the second content application constructs content related to the content subject using the second format and at least one of the first content segment or the second content segment.

3. The computer-implemented method of claim 1, wherein the first content application integrates the grammatical syntax elements into at least one sentence.

4. The computer-implemented method of claim 3, wherein:
   the content segment of each field includes a product name, a product class and a product description;
   the record stored at the database includes a first sentence that includes the product name and the product class, a second sentence that includes the product name and product description, a third sentence that includes the product name and a corresponding content segment, or any combination thereof.

5. The computer-implemented method of claim 1, wherein:
   the first content application includes the content segment with content related to a first marketing brand; and
   the second content application includes the content segment with content related to a second marketing brand.

6. A content management system, comprising:
   a content server comprising a processor and a tangible computer readable storage medium storing operational instructions that, when executed by the processor cause the content server to selectively retrieve at least one content segment of a plurality of content segments stored at a database accessible to the content server, wherein the database includes a plurality of records, and wherein at least one record of the plurality of records includes a plurality of fields storing a plurality of grammatical syntax elements associated with a content subject;

wherein the content server is configured to convert the at least one content segment to a first format and to provide a first data file that includes the at least one content segment to a first content application, wherein the first content application includes the content segment with content having a first technical level;

wherein the content server is configured to convert the at least one content segment to a second format and to provide a second data file that includes the at least one content segment to a second content application, wherein the second content application includes the content segment with content having a second technical level that is greater in technical specificity than the first technical level; and wherein the content server is configured to create an electronically distributable document comprising grammatically correct sentences based on the first format and the second format.

7. The content management system of claim 6, wherein each of the plurality of grammatical syntax elements has a rhetorical structure to facilitate selective assembly into at least one sentence.

8. The content management system of claim 7, wherein the at least one content segment includes a plurality of sentences derived from the plurality of grammatical syntax elements.

9. The content management system of claim 6, wherein the content server is coupled to the database.

10. The content management system of claim 6, wherein the content server includes the database.

11. A method of managing content, the method comprising:

requesting at least one content segment associated with a content subject from a content server;

receiving at least one grammatical syntax element from the content server, wherein the content server selectively retrieves the at least one grammatical syntax element from a plurality of grammatical syntax elements stored at a database;

constructing a first content related to the content subject, the first content including the at least one grammatical syntax element and a first marketing brand;

constructing a second content related to the content subject, the second content including the at least one grammatical syntax element and a second marketing brand;

delivering the first content to the first content application and the second content to the second content application over the distributed network via a gateway application;

integrating the at least one grammatical syntax element into at least one sentence; and producing an electronically distributable document that includes the at least one sentence.

12. The method of claim 11, further comprising receiving a request at the first content application via a distributed network for the at least one content segment associated with the content subject.

13. The method of claim 11, further comprising selectively using the at least one grammatical syntax element to construct the first content and the second content.

14. The method of claim 13, wherein the first content application provides the first content in a document, a flash file, a portable document file (PDF), an electronic file, a web page, or any combination thereof.

15. The method of claim 14, wherein the first content application is a proposal builder or an e-brochure builder.

16. A content management system, comprising:

an application server device comprising a processor and a tangible computer readable storage medium comprising operational instructions that, when executed by the processor cause the application server device to communicate with a distributed network to receive requests associated with a content subject from a first content application and a second content application;

wherein the application server device is configured to send requests to a content server for content segments associated with the content subject;

wherein the application server device is configured to communicate with the content server to receive a tag-segmented data file, the tag-segmented data file including a plurality of content segments associated with the content subject;

wherein the application server device is configured to selectively construct first content relating to the content subject, the first content including at least one of the plurality of content segments and a first marketing brand;

wherein the application server device is configured to selectively construct second content relating to the content subject, the second content including at least one of the plurality of content segments and a second marketing brand;

wherein the application server device is configured to deliver the first content to the first content application and the second content to the second content application over the distributed network via a gateway application; and wherein the first content and the second content are used to create an electronically distributable document having at least one sentence.

17. The system of claim 16, wherein the tag-segmented data file is an extensible markup language (XML) file.

18. The system of claim 16, wherein the first content and the second content are constructed using an extensible markup language (XML) parser.

19. The system of claim 16, wherein the gateway application is a product profiler system and wherein the plurality of content segments includes a product name, a product description, a product comparison statement, a product class, a product differentiator, or any combination thereof.

20. The system of claim 16, wherein the first content and the second content are constructed in accordance with an extensible stylesheet language (XSL) file.

* * * * *